United States Patent
Jalan et al.

(10) Patent No.: US 10,484,465 B2
(45) Date of Patent: *Nov. 19, 2019

(54) COMBINING STATELESS AND STATEFUL SERVER LOAD BALANCING

(71) Applicant: A10 NETWORKS, INC., San Jose, CA (US)

(72) Inventors: Rajkumar Jalan, Saratoga, CA (US); Feilong Xu, San Jose, CA (US); Lalgudi Narayanan Kannan, Los Altos, CA (US); Ronald Wai Lun Szeto, San Francisco, CA (US)

(73) Assignee: A10 Networks, Inc., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/858,578

(22) Filed: Dec. 29, 2017

(65) Prior Publication Data

US 2018/0124169 A1  May 3, 2018

Related U.S. Application Data

(63) Continuation of application No. 15/016,097, filed on Feb. 4, 2016, now Pat. No. 9,906,591, which is a
(Continued)

(51) Int. Cl.
*H04L 29/08* (2006.01)
*H04L 12/66* (2006.01)

(52) U.S. Cl.
CPC .......... *H04L 67/1027* (2013.01); *H04L 12/66* (2013.01); *H04L 67/10* (2013.01);
(Continued)

(58) Field of Classification Search
CPC ..... H04L 67/1027; H04L 67/28; H04L 67/10; H04L 67/142; H04L 67/2819; H04L 12/66
See application file for complete search history.

(56) References Cited

U.S. PATENT DOCUMENTS 5,218,602 A   6/1993 Grant et al.
5,774,660 A   6/1998 Brendel et al.
(Continued)

FOREIGN PATENT DOCUMENTS

CN   1372662   10/2002
CN   1449618   10/2003
(Continued)

OTHER PUBLICATIONS

Abe, et al., "Adaptive Split Connection Schemes in Advanced Relay Nodes," IEICE Technical Report, 2010, vol. 109 (438), pp. 25-30.
(Continued)

*Primary Examiner* — Brian T O Connor
(74) *Attorney, Agent, or Firm* — Keith Kline; The Kline Law Firm PC

(57) ABSTRACT

The processing of data packets sent over a communication session between a host and a server by a service gateway includes processing a data packet using a current hybrid-stateful or hybrid-stateless processing method. The processing then checks whether a hybrid-stateless or hybrid-stateful condition is satisfied. When one of the sets of conditions is satisfied, the process includes changing from a hybrid-stateful to a hybrid-stateless processing method, or vice versa, for a subsequently received data packet. If the conditions are not satisfied, the process continues as originally structured.

20 Claims, 11 Drawing Sheets

Related U.S. Application Data continuation of application No. 14/520,126, filed on Oct. 21, 2014, now Pat. No. 9,270,774, which is a continuation of application No. 13/280,336, filed on Oct. 24, 2011, now Pat. No. 8,897,154.

(52) U.S. Cl.
CPC ............ *H04L 67/142* (2013.01); *H04L 67/28* (2013.01); *H04L 67/2819* (2013.01)

(56) References Cited

U.S. PATENT DOCUMENTS

| | | | |
|---|---|---|---|
| 5,935,207 A | 8/1999 | Logue et al. | |
| 5,958,053 A | 9/1999 | Denker | |
| 5,995,981 A | 11/1999 | Wikstrom | |
| 6,003,069 A | 12/1999 | Cavill | |
| 6,047,268 A | 4/2000 | Bartoli et al. | |
| 6,131,163 A | 10/2000 | Wiegel | |
| 6,219,706 B1 | 4/2001 | Fan et al. | |
| 6,259,705 B1 | 7/2001 | Takahashi et al. | |
| 6,321,338 B1 | 11/2001 | Porras et al. | |
| 6,374,300 B2 | 4/2002 | Masters | |
| 6,459,682 B1 | 10/2002 | Ellesson et al. | |
| 6,587,866 B1 | 7/2003 | Modi et al. | |
| 6,748,414 B1 | 6/2004 | Bournas | |
| 6,772,334 B1 | 8/2004 | Glawitsch | |
| 6,779,017 B1 | 8/2004 | Lamberton et al. | |
| 6,779,033 B1 | 8/2004 | Watson et al. | |
| 6,952,728 B1 | 10/2005 | Alles et al. | |
| 7,010,605 B1 | 3/2006 | Dharmarajan | |
| 7,013,482 B1 | 3/2006 | Krumel | |
| 7,058,718 B2 | 6/2006 | Fontes et al. | |
| 7,069,438 B2 | 6/2006 | Balabine et al. | |
| 7,076,555 B1 | 7/2006 | Orman et al. | |
| 7,143,087 B2 | 11/2006 | Fairweather | |
| 7,167,927 B2 | 1/2007 | Philbrick et al. | |
| 7,181,524 B1 | 2/2007 | Lele | |
| 7,218,722 B1 | 5/2007 | Turner et al. | |
| 7,228,359 B1 | 6/2007 | Monteiro | |
| 7,234,161 B1 | 6/2007 | Maufer et al. | |
| 7,236,457 B2 | 6/2007 | Joe | |
| 7,254,133 B2 | 8/2007 | Govindarajan et al. | |
| 7,269,850 B2 | 9/2007 | Govindarajan et al. | |
| 7,277,963 B2 | 10/2007 | Dolson et al. | |
| 7,301,899 B2 | 11/2007 | Goldstone | |
| 7,308,499 B2 | 12/2007 | Chavez | |
| 7,310,686 B2 | 12/2007 | Uysal | |
| 7,328,267 B1 | 2/2008 | Bashyam et al. | |
| 7,334,232 B2 | 2/2008 | Jacobs et al. | |
| 7,337,241 B2 | 2/2008 | Boucher et al. | |
| 7,343,399 B2 | 3/2008 | Hayball et al. | |
| 7,349,970 B2 | 3/2008 | Clement et al. | |
| 7,370,353 B2 | 5/2008 | Yang | |
| 7,391,725 B2 | 6/2008 | Huitema et al. | |
| 7,398,317 B2 | 7/2008 | Chen et al. | |
| 7,423,977 B1 | 9/2008 | Joshi | |
| 7,430,755 B1 | 9/2008 | Hughes et al. | |
| 7,463,648 B1 | 12/2008 | Eppstein et al. | |
| 7,467,202 B2 | 12/2008 | Savchuk | |
| 7,472,190 B2 | 12/2008 | Robinson | |
| 7,492,766 B2 | 2/2009 | Cabeca et al. | |
| 7,506,360 B1 | 3/2009 | Wilkinson et al. | |
| 7,509,369 B1 | 3/2009 | Tormasov | |
| 7,512,980 B2 | 3/2009 | Copeland et al. | |
| 7,533,409 B2 | 5/2009 | Keane et al. | |
| 7,552,323 B2 | 6/2009 | Shay | |
| 7,584,262 B1 | 9/2009 | Wang et al. | |
| 7,584,301 B1 | 9/2009 | Joshi | |
| 7,590,736 B2 | 9/2009 | Hydrie et al. | |
| 7,613,193 B2 | 11/2009 | Swami et al. | |
| 7,613,822 B2 | 11/2009 | Joy et al. | |
| 7,673,072 B2 | 3/2010 | Boucher et al. | |
| 7,675,854 B2 | 3/2010 | Chen et al. | |
| 7,703,102 B1 | 4/2010 | Eppstein et al. | |
| 7,707,295 B1 | 4/2010 | Szeto et al. | |
| 7,711,790 B1 | 5/2010 | Barrett et al. | |
| 7,739,395 B1 | 6/2010 | Parlamas et al. | |
| 7,747,748 B2 | 6/2010 | Allen | |
| 7,751,409 B1 | 7/2010 | Carolan | |
| 7,792,113 B1 | 9/2010 | Foschiano et al. | |
| 7,808,994 B1 | 10/2010 | Vinokour et al. | |
| 7,826,487 B1 | 11/2010 | Mukerji et al. | |
| 7,881,215 B1 | 2/2011 | Daigle et al. | |
| 7,948,952 B2 | 5/2011 | Hurtta et al. | |
| 7,965,727 B2 | 6/2011 | Sakata et al. | |
| 7,970,934 B1 | 6/2011 | Patel | |
| 7,979,585 B2 | 7/2011 | Chen et al. | |
| 7,983,258 B1 | 7/2011 | Ruben et al. | |
| 7,990,847 B1 | 8/2011 | Leroy et al. | |
| 7,991,859 B1 | 8/2011 | Miller et al. | |
| 8,019,870 B1 | 9/2011 | Eppstein et al. | |
| 8,032,634 B1 | 10/2011 | Eppstein et al. | |
| 8,090,866 B1 | 1/2012 | Bashyam et al. | |
| 8,099,492 B2 | 1/2012 | Dahlin et al. | |
| 8,122,116 B2 | 2/2012 | Matsunaga et al. | |
| 8,179,809 B1 | 5/2012 | Eppstein et al. | |
| 8,185,651 B2 | 5/2012 | Moran et al. | |
| 8,191,106 B2 | 5/2012 | Choyi et al. | |
| 8,224,971 B1 | 7/2012 | Miller et al. | |
| 8,266,235 B2 | 9/2012 | Jalan et al. | |
| 8,296,434 B1 | 10/2012 | Miller et al. | |
| 8,312,507 B2 | 11/2012 | Chen et al. | |
| 8,379,515 B1 | 2/2013 | Mukerji | |
| 8,499,093 B2 | 7/2013 | Grosser et al. | |
| 8,539,075 B2 | 9/2013 | Bali et al. | |
| 8,554,929 B1 | 10/2013 | Szeto et al. | |
| 8,560,693 B1 | 10/2013 | Wang et al. | |
| 8,584,199 B1 | 11/2013 | Chen et al. | |
| 8,595,791 B1 | 11/2013 | Chen et al. | |
| RE44,701 E | 1/2014 | Chen et al. | |
| 8,675,488 B1 | 3/2014 | Sidebottom et al. | |
| 8,681,610 B1 | 3/2014 | Mukerji | |
| 8,750,164 B2 | 6/2014 | Casado et al. | |
| 8,782,221 B2 | 7/2014 | Han | |
| 8,813,180 B1 | 8/2014 | Chen et al. | |
| 8,826,372 B1 | 9/2014 | Chen et al. | |
| 8,879,427 B2 | 11/2014 | Krumel | |
| 8,885,463 B1 | 11/2014 | Medved et al. | |
| 8,897,154 B2 * | 11/2014 | Jalan .................. H04L 67/1027 370/252 |
| 8,965,957 B2 | 2/2015 | Barros | |
| 8,977,749 B1 | 3/2015 | Han | |
| 8,990,262 B2 | 3/2015 | Chen et al. | |
| 9,094,364 B2 | 7/2015 | Jalan et al. | |
| 9,106,561 B2 | 8/2015 | Jalan et al. | |
| 9,154,577 B2 | 10/2015 | Jalan et al. | |
| 9,154,584 B1 | 10/2015 | Han | |
| 9,215,275 B2 | 12/2015 | Kannan et al. | |
| 9,219,751 B1 | 12/2015 | Chen et al. | |
| 9,253,152 B1 | 2/2016 | Chen et al. | |
| 9,270,705 B1 | 2/2016 | Chen et al. | |
| 9,270,774 B2 | 2/2016 | Jalan et al. | |
| 9,338,225 B2 | 5/2016 | Jalan et al. | |
| 9,350,744 B2 | 5/2016 | Chen et al. | |
| 9,356,910 B2 | 5/2016 | Chen et al. | |
| 9,386,088 B2 | 7/2016 | Zheng et al. | |
| 9,497,201 B2 | 11/2016 | Chen et al. | |
| 9,531,846 B2 | 12/2016 | Han et al. | |
| 9,544,364 B2 | 1/2017 | Jalan et al. | |
| 9,602,442 B2 | 3/2017 | Han | |
| 9,609,052 B2 | 3/2017 | Jalan et al. | |
| 9,705,800 B2 | 7/2017 | Sankar et al. | |
| 9,749,387 B2 * | 8/2017 | Chadzelek ............ H04L 67/142 |
| 9,843,484 B2 | 12/2017 | Sankar et al. | |
| 9,900,252 B2 | 2/2018 | Chiong | |
| 9,906,422 B2 | 2/2018 | Jalan et al. | |
| 9,906,591 B2 | 2/2018 | Jalan et al. | |
| 9,942,152 B2 | 4/2018 | Jalan et al. | |
| 9,942,162 B2 | 4/2018 | Golshan et al. | |
| 9,961,135 B2 | 5/2018 | Kannan et al. | |
| 2001/0049741 A1 | 12/2001 | Skene et al. | |
| 2002/0032777 A1 | 3/2002 | Kawata et al. | |
| 2002/0078164 A1 | 6/2002 | Reinschmidt | |
| 2002/0091844 A1 | 7/2002 | Craft et al. | |

(56) References Cited

U.S. PATENT DOCUMENTS

| | | |
|---|---|---|
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0289231 A1 | 12/2005 | Harada et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |

(56) References Cited

U.S. PATENT DOCUMENTS

| | | |
|---|---|---|
| 2011/0047294 A1 | 2/2011 | Singh et al. |
| 2011/0060831 A1 | 3/2011 | Ishii et al. |
| 2011/0060840 A1 | 3/2011 | Susai et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0124713 A1 | 5/2013 | Feinberg et al. |
| 2013/0148500 A1 | 6/2013 | Sonoda et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0227165 A1 | 8/2013 | Liu |
| 2013/0250765 A1 | 9/2013 | Ehsan et al. |
| 2013/0250770 A1 | 9/2013 | Zou et al. |
| 2013/0258846 A1 | 10/2013 | Damola |
| 2013/0268646 A1 | 10/2013 | Doron et al. |
| 2013/0282791 A1 | 10/2013 | Kruglick |
| 2013/0336159 A1 | 12/2013 | Previdi et al. |
| 2014/0226658 A1 | 8/2014 | Kakadia et al. |
| 2014/0235249 A1 | 8/2014 | Jeong et al. |
| 2014/0248914 A1 | 9/2014 | Aoyagi et al. |
| 2014/0258465 A1 | 9/2014 | Li |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0325649 A1 | 10/2014 | Zhang |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0098333 A1 | 4/2015 | Lin et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0296058 A1 | 10/2015 | Jalan et al. |
| 2015/0312268 A1 | 10/2015 | Ray |
| 2015/0350048 A1 | 12/2015 | Sampat et al. |
| 2015/0350379 A1 | 12/2015 | Jalan et al. |
| 2016/0014126 A1 | 1/2016 | Jalan et al. |
| 2016/0042014 A1 | 2/2016 | Jalan et al. |
| 2016/0094470 A1 | 3/2016 | Skog |
| 2016/0139910 A1 | 5/2016 | Ramanathan et al. |
| 2016/0164792 A1 | 6/2016 | Oran |

FOREIGN PATENT DOCUMENTS

| | | |
|---|---|---|
| CN | 1473300 | 2/2004 |
| CN | 1529460 | 9/2004 |
| CN | 1575582 | 2/2005 |
| CN | 1714545 | 12/2005 |
| CN | 1725702 | 1/2006 |
| CN | 1910869 | 2/2007 |
| CN | 101004740 | 7/2007 |
| CN | 101094225 | 12/2007 |
| CN | 101163336 | 4/2008 |
| CN | 101169785 | 4/2008 |
| CN | 101189598 | 5/2008 |
| CN | 101193089 | 6/2008 |
| CN | 101247349 | 8/2008 |
| CN | 101261644 | 9/2008 |
| CN | 101495993 | 7/2009 |
| CN | 101878663 | 11/2010 |
| CN | 102143075 | 8/2011 |
| CN | 102546590 | 7/2012 |
| CN | 102571742 A | 7/2012 |
| CN | 102577252 A | 7/2012 |
| CN | 102918801 A | 2/2013 |
| CN | 103533018 | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 | 7/2015 |
| CN | 102577252 B | 3/2016 |
| CN | 102918801 B | 5/2016 |
| CN | 102571742 B | 7/2016 |
| EP | 1209876 | 5/2002 |
| EP | 1770915 | 4/2007 |
| EP | 1885096 | 2/2008 |
| EP | 2296313 | 3/2011 |
| EP | 2577910 | 4/2013 |
| EP | 2622795 | 8/2013 |
| EP | 2647174 | 10/2013 |
| EP | 2760170 A1 | 7/2014 |
| EP | 2772026 | 9/2014 |
| EP | 2901308 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 1/2014 |
| HK | 1198565 | 5/2015 |
| HK | 1198848 | 6/2015 |
| HK | 1199153 | 6/2015 |
| HK | 1199779 | 7/2015 |
| HK | 1200617 | 8/2015 |
| IN | 3764CHN2014 | 9/2015 |
| IN | 261CHE2014 | 1/2016 |
| IN | 1668CHENP2015 | 7/2016 |
| JP | H0997233 | 4/1997 |
| JP | H1196128 | 4/1999 |
| JP | H11338836 | 12/1999 |
| JP | 2000276432 | 10/2000 |
| JP | 2000307634 | 11/2000 |
| JP | 2001051859 | 2/2001 |
| JP | 2001298449 | 10/2001 |
| JP | 2002091936 | 3/2002 |
| JP | 2003141068 | 5/2003 |
| JP | 2003186776 | 7/2003 |
| JP | 2005141441 | 6/2005 |
| JP | 2006332825 | 12/2006 |
| JP | 2008040718 | 2/2008 |
| JP | 2009500731 | 1/2009 |
| JP | 2013528330 | 7/2013 |
| JP | 2014504484 | 2/2014 |
| JP | 2014143686 | 8/2014 |
| JP | 2015507380 | 3/2015 |
| JP | 5855663 | 2/2016 |

(56) References Cited

FOREIGN PATENT DOCUMENTS

| | | |
|---|---|---|
| JP | 5906263 | 4/2016 |
| JP | 5913609 | 4/2016 |
| JP | 5946189 | 7/2016 |
| JP | 5963766 | 8/2016 |
| KR | 20080008340 | 1/2008 |
| KR | 100830413 | 5/2008 |
| KR | 20130096624 | 8/2013 |
| KR | 101576585 | 12/2015 |
| KR | 101632187 | 6/2016 |
| KR | 101692751 | 1/2017 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 | 9/2004 |
| WO | WO2006098033 | 9/2006 |
| WO | WO2008053954 | 5/2008 |
| WO | WO2008078593 | 7/2008 |
| WO | WO2011049770 | 4/2011 |
| WO | WO2011079381 | 7/2011 |
| WO | WO2011149796 | 12/2011 |
| WO | WO2012050747 | 4/2012 |
| WO | WO2012075237 | 6/2012 |
| WO | WO2012083264 | 6/2012 |
| WO | WO2012097015 | 7/2012 |
| WO | WO2013070391 | 5/2013 |
| WO | WO2013081952 | 6/2013 |
| WO | WO2013096019 | 6/2013 |
| WO | WO2013112492 | 8/2013 |
| WO | WO2013189024 | 12/2013 |
| WO | WO2014031046 | 2/2014 |
| WO | WO2014052099 | 4/2014 |
| WO | WO2014088741 | 6/2014 |
| WO | WO2014093829 | 6/2014 |
| WO | WO2014138483 | 9/2014 |
| WO | WO2014144837 | 9/2014 |
| WO | WO2014179753 | 11/2014 |
| WO | WO2015153020 | 10/2015 |

OTHER PUBLICATIONS

Cardellini, et al., "Dynamic Load Balancing on Web-Server Systems," IEEE Internet Computing, 1999, vol. 3 (3), pp. 28-39.
FreeBSD, "tcp—TCP Protocal," Linux Programme☐ s Manual [online], 2007, [retrieved on Apr. 13, 2016], Retreived from the Internet: <https://www.freebsd.org/cgi/man.cgi?query=tcp&apropos=0&sektion=7&manpath=SuSe+Linux%2Fi386+11.0&format=asci>.
Gite, "Linux Tune Network Stack (Buffers Size) to Increase Networking Performance," nixCraft [online], 2009, [retreived on Apr. 13, 2016], Retreived from the Internet: <URL:http://www.cyberciti.biz/faq/linux-tcp-tuning/>.
Goldszmidt, et al., "NetDispatcher: A TCP Connection Router," IBM Researc Report, RC 20853, 1997, pp. 1-31.
Kjaer, et al., "Resource Allocation and Disturbance Rejection in Web Servers Using SLAs and Virtualized Servers," IEEE Transactions on Network Service Management, 2009, vol. 6 (4), pp. 226-239.
Koike, et al., "Transport Middleware for Network-Based Control," IEICE Technical Report, 2000, vol. 100 (53), pp. 13-18.
Noguchi, "Realizing the Highest Level "Layer 7" Switch"= Totally Managing Network Resources, Applications, and Users =, Computer & Network LAN, 2000, vol. 18 (1), pp. 109-112.
Ohnuma, "AppSwitch: 7th Layer Switch Provided with Full Setup and Report Tools," Interop Magazine, 2000, vol. 10 (6), pp. 148-150.
Sharifian, et al., "An Approximation-Based Load-Balancing Algorithm with Admission Control for Cluster Web Servers with Dynamic Workloads," The Journal of Supercomputing, 2010, vol. 53 (3), pp. 440-463.
Spatscheck, et al., "Optimizing TCP Forwarder Performance," IEEE/ACM Transactions on Networking, 2000, vol. 8 (2), pp. 146-157.
Search Report and Written Opinion dated Mar. 29, 2013 for PCT Application No. PCT/US2012/060317.
Takahashi, "The Fundamentals of the Windows Network: Understanding the Mystery of the Windows Network from the Basics," Network Magazine, 2006, vol. 11 (7), pp. 32-35.
Yamamoto, et al., "Performance Evaluation of Window Size in Proxy-Based TCP for Multi-Hop Wireless Networks," IPSJ SIG Technical Reports, 2008, vol. 2008 (44), pp. 109-114.

* cited by examiner

COMBINING STATELESS AND STATEFUL SERVER LOAD BALANCING

CROSS-REFERENCE TO RELATED APPLICATIONS

This application is a continuation of and claims the priority benefit of U.S. patent application Ser. No. 15/016,097 filed on Feb. 4, 2016, entitled "Combining Stateless and Stateful Server Load Balancing," which is in turn is a continuation of U.S. patent application Ser. No. 14/520,126 filed on Oct. 21, 2014, and issued on Feb. 23, 2016 as U.S. Pat. No. 9,270,774, entitled "Combining Stateless and Stateful Server Load Balancing," which in turn is a continuation of U.S. patent application Ser. No. 13/280,336 filed on Oct. 24, 2011, and issued on Nov. 25, 2014 as U.S. Pat. No. 8,897,154, entitled "Combining Stateless and Stateful Server Load Balancing," the disclosures of which are incorporated herein by reference.

BACKGROUND OF THE INVENTION

Field

This invention relates generally to data communications, and more specifically, to a service gateway.

Related Art

Demand for data communication services for consumer and corporate computing devices has been rapidly increasing. Service providers deploy service gateways such as server load balancers or traffic managers to bridge host computers or computing devices with servers providing the data services.

Service gateways provide services either using a stateful processing method or a stateless processing method. Generally, in a stateful processing method, packets are processed as a stream of packets, and each packet in the stream are processed in the same way. In a stateless processing method, packets are processed discretely, where each packet is assessed individually. The stateful processing method may be preferred over the stateless processing method due to the security and control features that may be implemented, however, the resource requirements of such features may make the services difficult to scale. The stateless processing method may be preferred over the stateful processing method due to its scalability, however, this is at the expense of security and control.

Traffic managed by service gateways is rarely uniform, as conditions on a network typically fluctuate, at times greatly. Currently, system administrators are required to choose either a stateful processing method or a stateless processing method for a particular service address, weighing the costs and benefits of each method. System administrators are not able to realize the advantages of both processing methods for such non-uniform traffic.

SUMMARY OF THE INVENTION

According to one embodiment of the present invention, a method for processing data packets sent over a communication session between a host and a server by a service gateway, comprises: processing a data packet using a hybrid-stateful processing method by the service gateway; checking by the service gateway whether a hybrid-stateless condition is satisfied; in response to determining that the hybrid-stateless condition is satisfied, changing to a hybrid-stateless processing method for a subsequently received data packet by the service gateway; and in response to determining that the hybrid-stateless condition is not satisfied, processing the subsequently received data packet using the hybrid-stateful processing method by the service gateway.

In another embodiment of the present invention, a method for processing data packets sent over a communication session between a host and a server by a service gateway, comprises: processing a data packet using a hybrid-stateless processing method by the service gateway, wherein the hybrid-stateless processing method processes the data packet using a stateless processing method unless a service address or a server address of the data packet matches a session entry in a session table; checking by the service gateway whether a hybrid-stateful condition is satisfied; in response to determining that the hybrid-stateful condition is satisfied, changing to a hybrid-stateful processing method for a subsequently received data packet by the service gateway, wherein the hybrid-stateful processing method processes the subsequently received data packet using a stateful processing method unless the subsequently received data packet either does not comprise a service request or the subsequently received data packet is received from the server; in response to determining that the hybrid-stateful condition is not satisfied, processing the subsequently received data packet using the hybrid-stateless processing method by the service gateway; wherein the hybrid-stateful processing method comprises: receiving the data packet by the service gateway; determining by the service gateway whether the data packet is received by the service gateway from the host or the server; in response to determining that the data packet is received from the host, determining by the service gateway whether the data packet comprises a service request; in response to determining that the data packet comprises the service request, processing the data packet using the stateful processing method by the service gateway; in response to determining that the data packet is received from the host and does not comprise the service request, processing the data packet using the hybrid-stateless processing method by the service gateway; and in response to determining that the data packet is received from the server, processing the data packet using the hybrid-stateless processing method by the service gateway.

In one aspect of the present invention, the hybrid-stateless processing method comprises: receiving the subsequently received data packet from the host by the service gateway; obtaining the service address from the subsequently received data packet by the service gateway; comparing the service address of the subsequently received data packet against service addresses stored in session entries in the session table by the service gateway; in response to determining that the session table comprises a session entry matching the service address of the subsequently received data packet, processing the subsequently received data packet based on information stored in the matching session entry using the stateful processing method by the service gateway. In response to determining that the session table does not comprise any session entry matching the service address of the subsequently received data packet: comparing the service address of the subsequently received data packet against service addresses stored in mapping entries in a mapping table by the service gateway, finding a mapping entry matching the service address of the subsequently received data packet by the service gateway, and processing the subsequently received data packet based on information stored in the matching mapping entry using the stateless processing method by the service gateway.

System and computer program products corresponding to the above-summarized methods are also described and claimed herein.

DETAILED DESCRIPTION OF THE INVENTION

Figure 1:
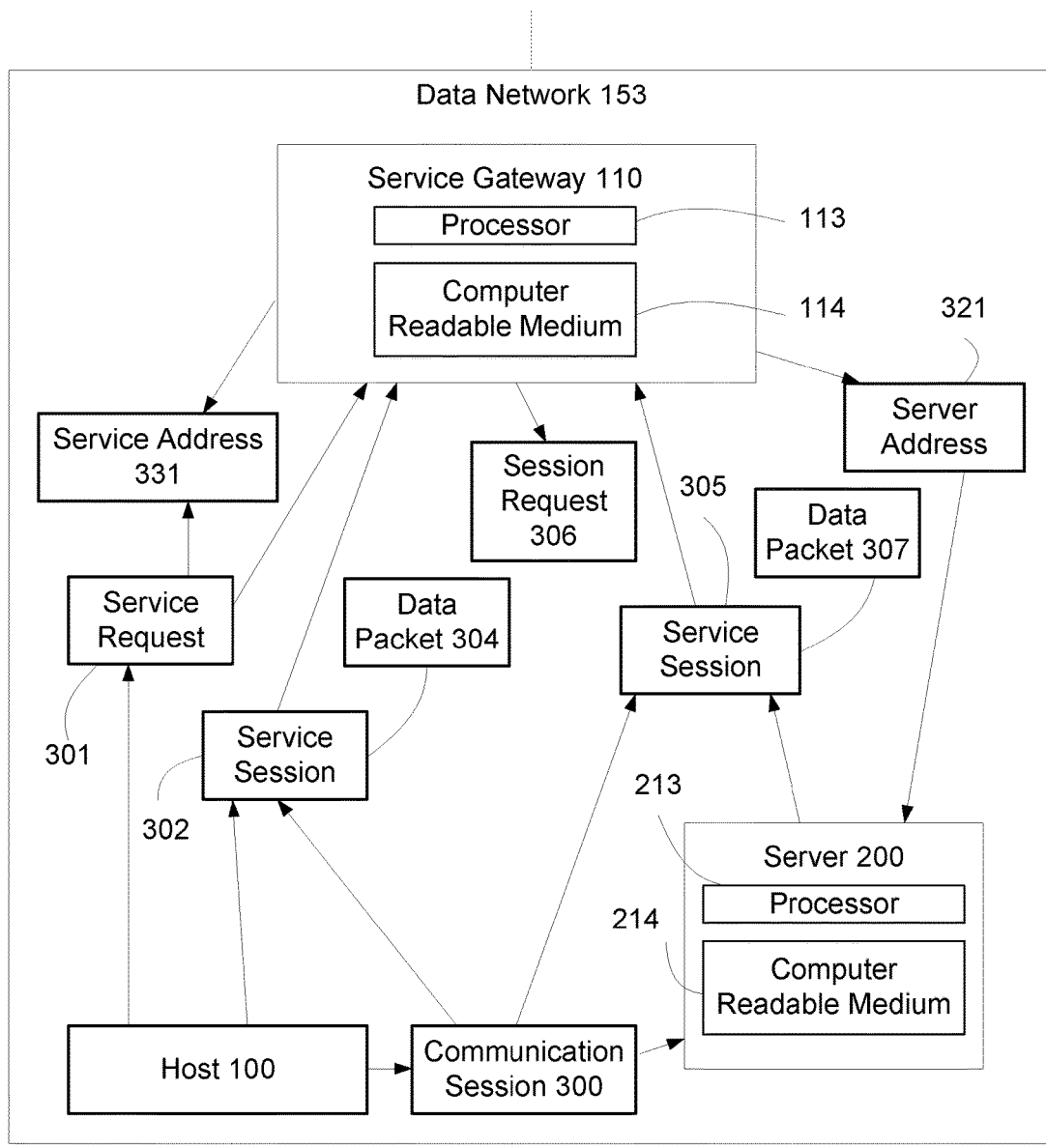
FIG. 1 illustrates a service gateway for processing a communication session between a host and a plurality of servers.

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Embodiments of the present invention provide a security gateway with the capability of processing packets using either a hybrid stateless processing method or a hybrid stateful processing method, and with the capability for assessing conditions in determining whether to switch from using the hybrid stateful processing method to the hybrid stateless processing method or vice versa. Before describing the various embodiments of the present invention, the stateful only and stateless only methods are first described with reference to FIGS. 1 through 3.

FIG. 1 illustrates a service gateway 110 for processing a communication session 300 between a host 100 and a server 200. A plurality of data packets are sent between host 100 and server 200 over the communication session 300. The service gateway 110 receives a service request 301 data packet from a host 100 to establish communication session 300. Service request 301 is delivered over a data network 153. Service request 301 may be a Web service request such as a HTTP (Hypertext Transport Protocol) request, a secure HTTP request, a FTP (File Transfer Protocol) request, a file transfer request, a SIP (Session Initiation Protocol) session request, a request based on Web technology, a video or audio streaming request, a Web conferencing session request, or any request over the Internet, corporate network, data center network, or a network cloud. Service request 301 may be a request for a mobile application download, an advertisement delivery request, an e-book delivery request, a collaboration session request, or an on-line newspaper or magazine delivery request.

Host 100 is a computing device with network access capabilities. Host 100 may be a workstation, a desktop personal computer or a laptop personal computer. In some embodiments, host 100 is a Personal Data Assistant (PDA), a tablet, a smartphone, or a cellular phone. For other examples, host 100 may be a set-top box, an Internet media viewer, an Internet media player, a smart sensor, a smart medical device, a net-top box, a networked television set, a networked DVR, a networked Blu-ray player, or a media center.

Service gateway 110 is a computing device operationally coupled to a processor 113 and a computer readable medium 114 for storing computer readable program code to be executed by the processor 113. Service gateway 110 may be implemented as a server load balancer, an application delivery controller, a service delivery platform, a traffic manager, a security gateway, a component of a firewall system, a component of a virtual private network (VPN), a load balancer for video servers, or a gateway to distribute load to one or more servers.

Server 200 is a computing device operationally coupled to a processor 213 and a computer readable medium 214 for storing computer readable program code to be executed by the processor 213. The computer readable program code may implement server 200 as a Web server, a file server, a video server, a database server, an application server, a voice system, a conferencing server, a media gateway, a SIP server, a remote access server, a VPN server, a media center, an app server or a network server providing a network or application service to host 100.

Data network 153 may include an Internet Protocol (IP) network. Data network 153 may include a corporate data network or a regional corporate data network, an Internet service provider network, a residential data network, a wired network such as Ethernet, a wireless network such as a WiFi network, or cellular network. Data network 153 may reside in a data center, or connects to a network or application network cloud.

Service request 301 from host 100 includes a service address 331, such as an IP address. Service address 331 includes an application layer address or a transport layer port number, such as transmission control protocol (TCP) port number or user datagram protocol (UDP) port number. Service address 331 is associated with service gateway 110 so that service gateway 110 processes the service request 301. Service address 331 may include a destination IP address of service request 301, and optionally may include destination transport layer port number of service request 301.

Service request 301 may include a TCP session request data packet, or a UDP data packet. Service address 331 is included in the data packet of service request 301.

Service gateway 110 determines a server address 321 based on service address 331 obtained from service request 301. Server address 321 is associated with server 200 and may include a network address or IP address of server 200. Server address 321 may include an application layer address, such as a TCP port number or a UDP port number of server 200.

Based on server address 321, service gateway 110 sends a service session request 306 to server 200. Subsequently service gateway 110 receives a response to session request 306 from server 200 and establishes a server-side service session 305 with server 200. Based on session request 306 response, service gateway 110 sends a service request 301 response to host 100, and establishes a host-side service session 302 with host 100 for service request 301.

Communication session 300 includes host-side service session 302 and server-side service session 305. Service session 302 includes one or more data packets from host 100 for communication session 300. Service session 305 includes one or more data packets from server 200 for communication session 300. Service session 302 may include service request 301.

Upon establishment of service session 302 and service session 305, service gateway 110 subsequently processes a data packet 304 of service session 302 received from host 100. Data packet 304 includes service address 331. Service gateway 110 modifies data packet 304 by replacing service address 331 with server address 321. Service gateway 110 sends modified data packet 304 to server 200.

When service gateway 110 receives a data packet 307 of service session 305 from server 200, service gateway 110 processes data packet 307. Data packet 307 of service session 305 may include server address 321. Service gateway 110 modifies data packet 307 by replacing server address 321 with service address 331. Service gateway 110 sends modified data packet 307 to host 100.

Figure 2:
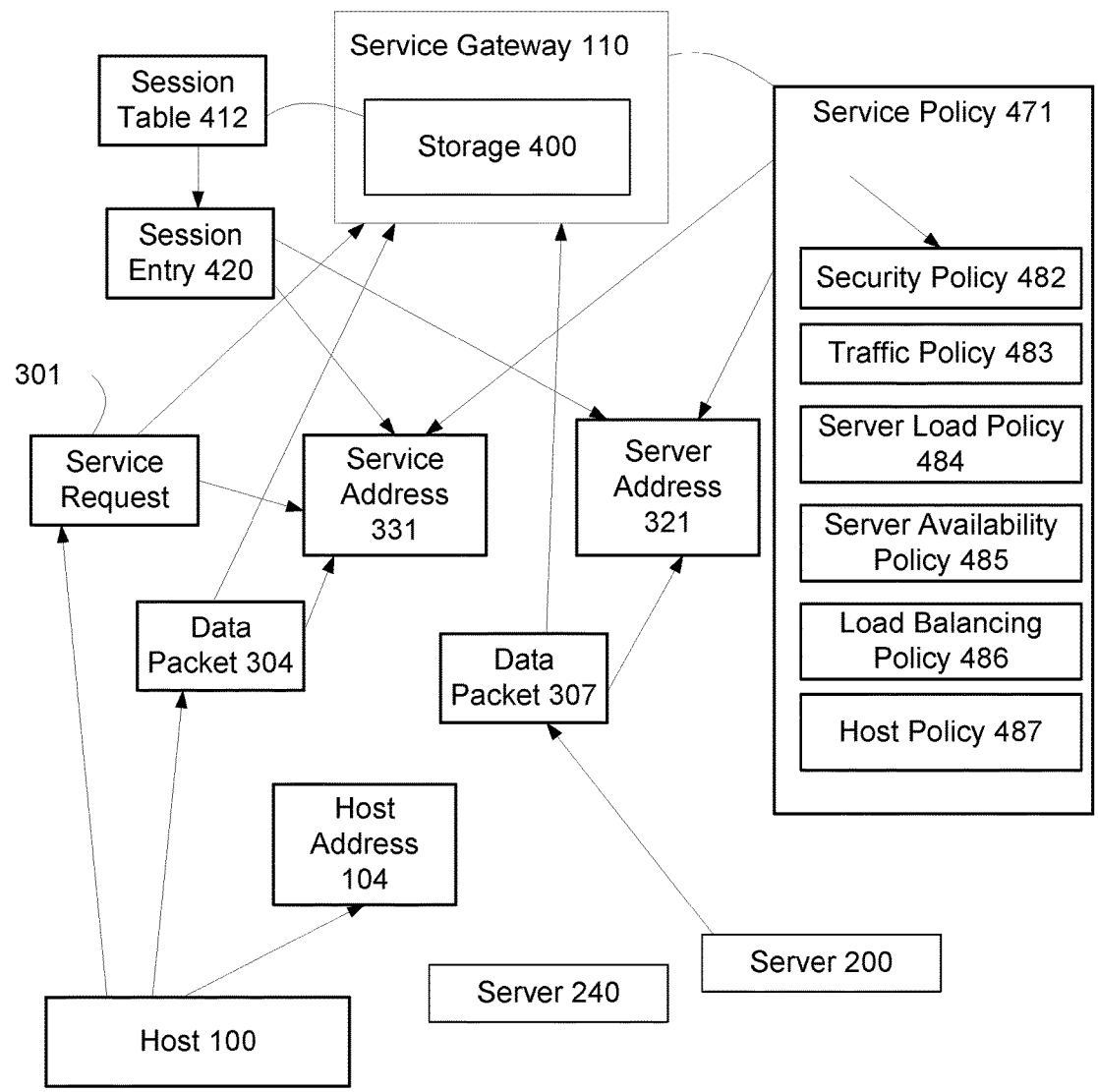
FIG. 2 illustrates a stateful processing method.

There are two common methods in processing service session 302 and service session 305: a stateful processing method and a stateless processing method. FIG. 2 illustrates a stateful processing method. In FIG. 2, service gateway 110 maintains a service session table 412. Session table 412 stores one or more service session entries. Service gateway 110 creates a session entry 420 for service session 302. Session entry 420 stores service address 331 and server address 321 to associate service address 331 and server address 321. Service gateway 110 may create session entry 420 after establishing host-side service session 302 and server-side service session 305. Service gateway 110 may create session entry 420 after receiving service request 301. Service gateway 110 stores service address 331 and server address 321 in session entry 420 after service gateway 110 determines the addresses. Service gateway 110 stores session entry 420 in session table 412.

Service gateway 110 includes a storage 400 and stores session table 412 in storage 400. Storage 400 is a memory module residing in service gateway 110. Service gateway 110 includes a network processing module (not shown) comprising a field programmable gate array (FPGA), a network processor, an application specific integrated circuit (ASIC). Storage 400 is associated with the network processing module. Examples of storage 400 include a content addressable memory (CAM), a ternary content addressable memory (TCAM), a static random accessible memory (SRAM), or a dynamic random accessible memory (DRAM).

Service gateway 110 obtains service address 331 from service request 301. Service gateway 110 maintains a service policy 471 and determines server address 321 based on service policy 471. Service policy 471 may be based on a relationship between server 200 and service address 331. Service policy 471 includes service address 331 and server address 321. Service gateway 110 selects service policy 471 based on a match between service address 331 obtained from service request 301 and the service address in the service policy 471. Service gateway 110 applies service policy 471 to service request 301. Service policy 471 may include a security policy 482 where a non-secure service request 301 can be sent to server 200. Service policy 471 may include a traffic policy 483, where service request 301 is served by server 200 when traffic load to server 200 is low. Service request 301 may be received from a predetermined network interface of service gateway 110 and traffic policy 483 indicates that service request 301 from the network interface should be sent to server 200.

Server 240 also serves service request 301. Service policy 471 may include a server load policy 484 indicating that service request 301 is to be sent to server 200 when server load of server 240 is high. In one example, service policy 471 includes a server availability policy 485 indicating that service request 301 is to be sent to server 200, where server 200 is a back-up server to server 240, and server 240 is not available. Service policy 471 may include a load balancing policy 486 between server 200 and server 240. Service gateway 110 selects server 200 using the load balancing policy 486, which may include a round robin or another load balancing scheme. Service policy 471 may include a host policy 487 indicating that service request 301 is to be sent to server 200 when host 100 satisfies host policy 487.

After service gateway 110 applies service policy 471 to service request 301, service gateway 110 retrieves server address 321 from service policy 471. Service gateway 110 creates session entry 420 with service address 331 and server address 321, associating service address 331 and server address 321. Service gateway 110 stores session entry 420 in session table 412.

Service gateway 110 uses session table 412 to process data packet 304 received from host 100, and data packet 307 received from server 200. When service gateway 110 receives data packet 304 from host 100, service gateway 110 obtains service address 331 from data packet 304. Service gateway 110 compares the obtained service address 331 against service addresses stored in session table 412. When service gateway 110 determines there is a match between the obtained service address 331 and session entry 420 in session table 412, service gateway 110 uses information stored in session entry 420 to process data packet 304. Service gateway 110 modifies data packet 304 by replacing service address 331 with server address 321, where server address 321 is obtained from the matched session entry 420. Service gateway 110 sends modified data packet 304 to server 200.

Service request 301 may include a host address 104 associated with host 100. Service gateway 110 retrieves host address 104 from service request 301. Service gateway 110 may use retrieved host address 104 when applying service policy 471. Service gateway 110 stores host address 104 in service session entry 420. Data packet 304 may include host address 104. Service gateway 110 obtains host address 104 from data packet 304 and compares the obtained host address 104 against addresses stored in session table 412 and session entry 420.

When service gateway 110 receives a data packet 307 of server-side service session 305 from server 200, service gateway 110 retrieves server address 321 from data packet 307. Service gateway 110 compares the obtained server address 321 against addresses stored in session table 412, and determines there is a match with session entry 420. In response to determining there is a match, service gateway 110 uses session entry 420 to process data packet 307. Service gateway 110 modifies data packet 307 by replacing server address 321 with service address 331, which is retrieved from the matched session entry 420. Service gateway 110 sends modified data packet 307 to host 100.

Data packet 307 may include host address 104. Service gateway 110 obtains host address 104 from data packet 307 and uses the obtained host address 104 in comparing against addresses stored in session table 412 and session entry 420.

Data packet 304 received from service session 302 may indicate a session termination request. For example, data packet 304 is a TCP FIN packet, a TCP RESET packet. Service gateway 110 inspects data packet 304 content and determines data packet 304 includes a session termination request. In response, service gateway 110 removes session entry 420 from session table 412. Service gateway 110 may remove session entry 420 after processing data packet 304 or waits for a pre-determined period of time before removing session entry 420.

The processing method illustrated in FIG. 2 is often referred as a stateful processing method. A stateful processing method allows service gateway 110 to apply one or more service policies to select server 200. The service policies may include security policies and other policies to protect server 200. Security policy 482 may cause service request 301 to be declined if a security concern is detected. Such security consideration is known to those skilled in the art and is not described in this application. Applying traffic policy 483 or server load policy 484 can also protect server 200 from overloading. Enforcing the service policies often improves service response time of server 200 to serve host 100.

However, applying service policy 471 to service request 301 requires computation resource of service gateway 110, such as CPU cycles. Such computation requirement may post a limitation on the ability of service gateway 110 to provide services when service gateway 110 receives and processes a large number of service requests over a short period of time.

For example, session table 412 has a certain capacity limit, such as 4 GB, 2000 entries, up to 10000 entries or 200 MB. The greater the number of service sessions serviced by service gateway 110 using a stateful processing method, the greater the number of session entries stored in session table 412. The capacity of session table 412 may become a severe limitation to the servicing capabilities of service gateway 110.

Figure 3:
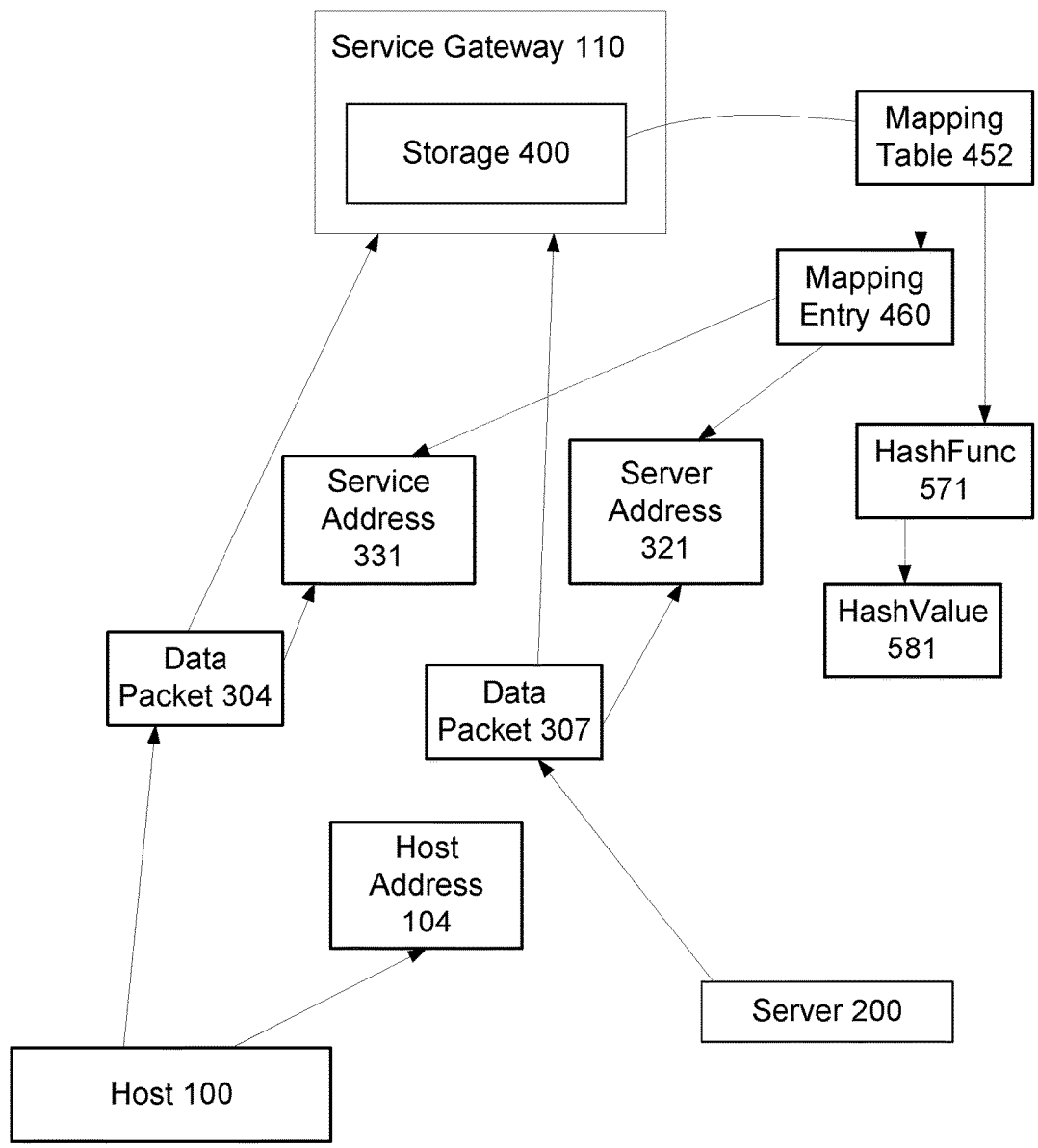
FIG. 3 illustrates a stateless processing method.

FIG. 3 illustrates a stateless processing method. In this method, service gateway 110 does not use session table 412. Instead, service gateway 110 maintains and uses a service mapping table 452. Service mapping table 452 is stored in storage 400. Service mapping table 452 includes a service mapping entry 460. Mapping entry 460 may include service address 331 and server address 321, associating service address 331 and server address 321. According to the service mapping entry 460, server 200 with server address 321 serves host 100 for service address 331.

When service gateway 110 receives a data packet 304 from host 100, service gateway 110 obtains service address 331 from data packet 304, and compares service address 331 with service addresses stored in service mapping table 452. When service gateway 110 determines there is a match with mapping entry 460, service gateway 110 retrieves server address 321 from mapping entry 460. Service gateway 110 modifies data packet 304 by replacing service address 331 with server address 321. Service gateway 110 sends modified data packet 304 to server 200.

When service gateway 110 receives a data packet 307 from server 200, service gateway 110 processes data packet 307 using service mapping table 452. Service gateway 110 obtains server address 321 from data packet 307. Service gateway 110 compares server address 321 against server addresses stored in service mapping table 452. When service gateway 110 determines there is a match with mapping entry 460, service gateway 110 retrieves service address 331 from mapping entry 460, and modifies data packet 307 by replacing server address 321 with service address 331. Subsequently service gateway 110 sends modified data packet 307 to host 100.

Service gateway 110 may match service address 331 or server address 321 against service mapping table 452 using a hash method. Service mapping table 452 includes a hash table using a hash function (HashFunc) 571. Mapping entry 460 is associated with a hash value (HashValue 581).

HashValue 581 includes the result of applying HashFunc 571 to service address 331. HashValue 581 may include the result of applying HashFunc 571 to server address 321.

HashValue 581 may include an index of mapping entry 460 in service mapping table 452. Mapping entry 460 occupies an entry in service mapping table 452 indexed by HashValue 581. For example, service mapping table 452 contains 1000 entries where the indices are 1-1000, and mapping entry 460 has an index of 894. In another example, service mapping table 452 contains 16 entries and mapping entry 460 has an index of 7.

Service gateway 110 applies HashFunc 571 to service address 331 of data packet 304 to obtain HashValue 581. Assume that service gateway 110 searches service mapping table 452 for an entry with index HashValue 581 and finds mapping entry 460. For data packet 307, service gateway 110 applies HashFunc 571 to server address 321 of data packet 307 to obtain HashValue 581. Service gateway 110 searches service mapping table 452 for an entry with index HashValue 581 and finds mapping entry 460.

Mapping entry 460 may include HashValue 581. After service gateway 110 applies hash function HashFunc 571 to obtain HashValue 581, service gateway 110 searches service mapping table 452 and finds mapping entry 460 containing an index matching HashValue 581.

Examples of hash functions HashFunc 571 include CRC checksum functions and other checksum functions; hash functions using a combination of bit-wise operators such as bit-wise AND operator, bit-wise OR operator, bit-wise NAND operator and bit-wise XOR operator; MD5 hash functions and other cryptography hash functions; Jenkins hash function and other non-cryptography hash functions; hardware based hash functions implemented in FPGA, ASIC or an integrated circuit board of service gateway 110; and other types of hash functions or table lookup functions. Typically such hash functions are simple and can be calculated rapidly by service gateway 110.

Data packet 304 includes host address 104 associated with host 100. Service gateway 110 obtains host address 104 from data packet 304 and uses the obtained host address 104 in the processing of data packet 304.

Data packet 307 includes host address 104. Service gateway 110 obtains host address 104 from data packet 307 and uses the obtained host address 104 in the processing of data packet 307.

Typically, mapping entry 460 is configured by a service provider or an administrator of a service provider. Mapping entry 460 may be configured when server 200 becomes available, or when server address 321 or service address 331 becomes available. Server address 321 or service address 331 may be configured by the service provider to become available.

In this stateless processing method, service mapping table 452 is not related to the number of service sessions processed by service gateway 110. The capacity of service mapping table 452 is related to the number of available service addresses and server addresses. Such capacity is usually small. Service mapping tables 452 may have a few tens of entries or a few thousand entries.

The advantages of a stateless processing method include small resource requirement for service mapping table 452, a minimal or no computational requirement to handle service request 301, or no requirements to apply service policy 471. A stateless processing method is usually preferred over a stateful processing method when service gateway 110 receives a large number of service session requests in a short period of time, or under a heavy load of service requests. A stateless method is also preferred when the memory capacity of session table for new sessions is running low, say below 10% of the session table 412. A stateless method protects service gateway 110 from resource overload and therefore maintains service quality towards host 100 under stressful situations.

However, a stateless processing method may be less desirable than a stateful processing method due to security concerns, since service gateway 110 does not apply security policy 482. Similarly service gateway 110 does not apply any other policy in service policy 471, affecting security of server 200, security of data network 153, traffic condition of data network 153, and service quality rendered to host 100. A stateful processing method is also preferred over the stateless processing method when service gateway 110 may select server address 321 from a plurality of server addresses. For example, a service provider may configure a plurality of servers to serve service address 331 in a load balancing manner. A service provider may configure a backup server for service address 331.

In a typical deployment scenario, a service provider may use a stateful processing method for a first service address while using a stateless processing method for a different second service address. The service provider does not expect the first service to have significant traffic or usage. The service provider may not expect the second service to be a security concern. In reality, the first service may see a sudden surge of traffic due to an unforeseen situation, whereas the second service may suffer a security attack. Using a hybrid processing method according to the present invention, as described below, a service provider may combine a stateful processing method for the first service when the load is light and change to a stateless processing method when the load becomes heavy; and may deploy a hybrid processing method to combine a stateless processing method for the second service during normal circumstances and switch immediately to a stateful processing method when a security alert is detected for the second service.

The various embodiment of the present invention are now described with reference to FIGS. 4 through 11.

Figure 4:
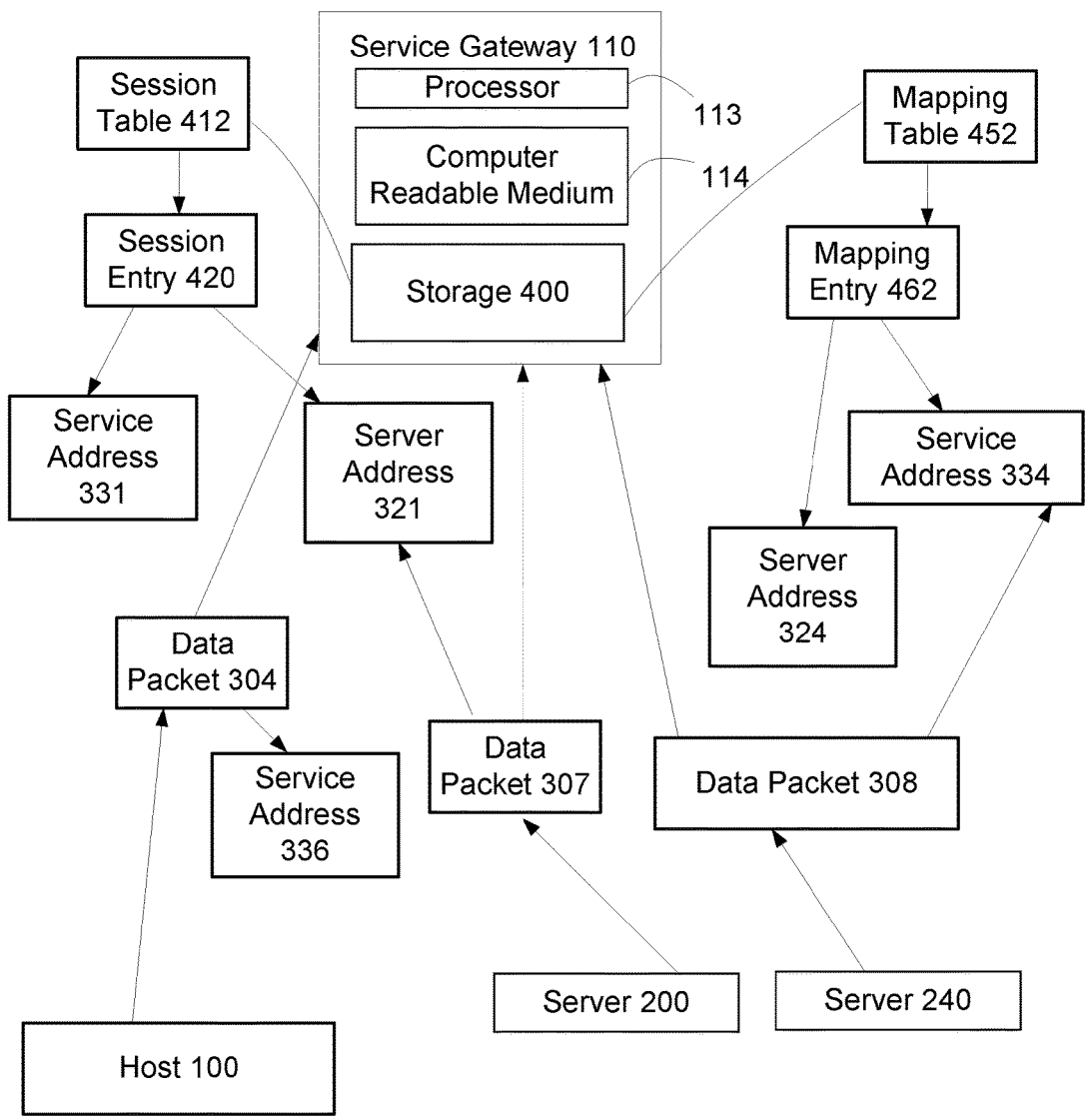
FIG. 4 illustrates an embodiment of a service gateway performing a hybrid-stateless processing method combining a stateful processing method and a stateless processing method according to the present invention.
Figure 8:
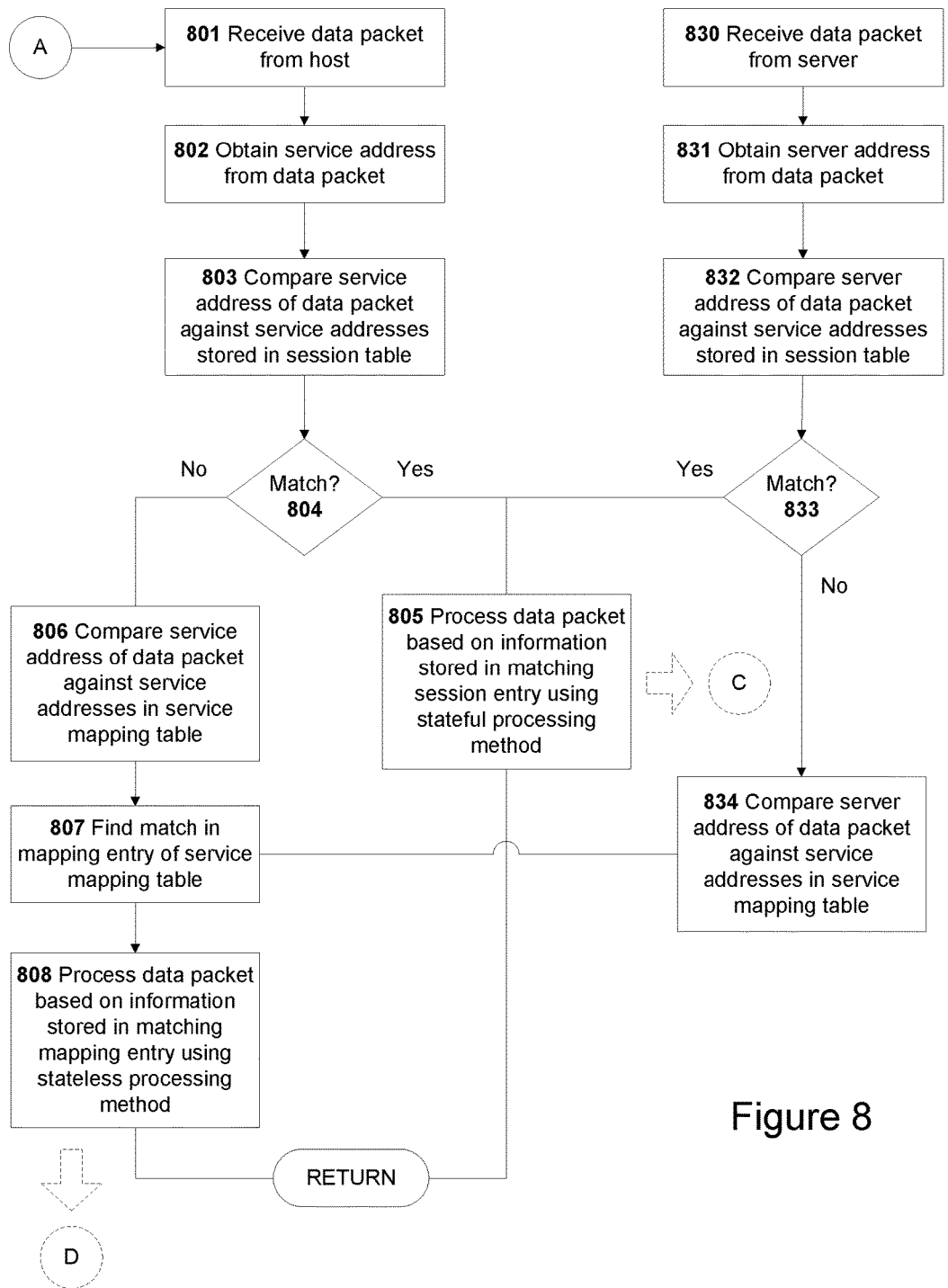
FIG. 8 is a flowchart illustrating an embodiment of a hybrid-stateless processing method according to the present invention.

FIG. 4 illustrates an embodiment of a service gateway 110 performing a hybrid-stateless processing method combining a stateful processing method and a stateless process method according to the present invention. FIG. 8 is a flowchart illustrating an embodiment of a hybrid-stateless processing method according to the present invention. In this embodiment, the computer readable medium 114 of the service gateway 110 stores computer readable program code, which when executed by processor 113, implements the various embodiment of the present invention. Service gateway 110 maintains session table 412 and service mapping table 452 in storage 400. In this embodiment of a hybrid-stateless processing method, service gateway 110 processes a received data packet 304 with a stateless method using service mapping table 452 when the service address of the received data packet 304 does not match any service addresses stored in session table 412.

Service gateway 110 connects to server 200 and server 240. Server 200 is associated with server address 321. Server 240 is associated with server address 324. Service gateway 110 is associated with service address 331 and service address 334.

In some embodiments, session table 412 includes a session entry 420 which stores service address 331 and server address 321, associating service address 331 and server address 321. Service mapping table 452 includes a mapping entry 462 which stores service address 334 and server address 324, associating service address 334 and server address 324.

In various embodiments, server 200 may be the same as server 240. Server address 321 may be the same as server address 324. Service address 331 may be the same as service address 334.

Referring to both FIGS. 4 and 8, service gateway 110 receives a data packet 304 from host 100 (801). Service gateway 110 obtains service address 336 from data packet 304 (802). Service gateway 110 compares service address 336 of data packet 304 against service addresses stored in session table 412 (803).

In some embodiments, service gateway 110 finds a match in session entry 420, where service address 336 matches service address 331 of session entry 420 (804). In response to finding the match, service gateway 110 processes data packet 304 based on information stored in session entry 420 using a stateful processing method (805), such as the one described above with reference to FIG. 2.

When service gateway 110 does not find a match in session table 412 (804), service gateway 110 compares service address 336 of data packet 304 against service addresses in service mapping table 452 (806). If service gateway 110 finds a match in mapping entry 462 of service mapping table 452, wherein service address 336 matches service address 324 of mapping entry 462 (807), service gateway 110 processes data packet 304 based on information stored in mapping entry 462 using a stateless processing method (808), such as the one described above with reference to FIG. 3.

In various embodiments, service gateway 110 receives a data packet 307 from server 200 (830). Service gateway 110 extracts server address 321 from data packet 307 (831) and compares server address 321 of data packet 307 against server addresses stored in session table 412 (832). When service gateway 110 finds a match in session entry 420, with server address 321 of data packet 307 matching server address 321 of session entry 420 (803), service gateway 110 processes data packet 308 using the stateful processing method (805), as described above with reference to FIG. 2.

In some embodiments, service gateway 110 receives a data packet 308 from server 240 (830). Service gateway 110 extracts server address 324 from data packet 308 (832) and compares server address 324 of data packet 308 against server addresses stored in session table 412 (832). When service gateway 110 does not find a match (833), service gateway 110 compares server address 324 of data packet 308 against server addresses stored in service mapping table 452 (834) and finds a match in mapping entry 462, where server address 324 of data packet 308 matches server address 324 of mapping entry 462 (807). In response, service gateway 110 modifies data packet 308 based on information stored in mapping entry 462 using a stateless processing method (808). Service gateway 110 sends modified data packet 308.

Figure 5:
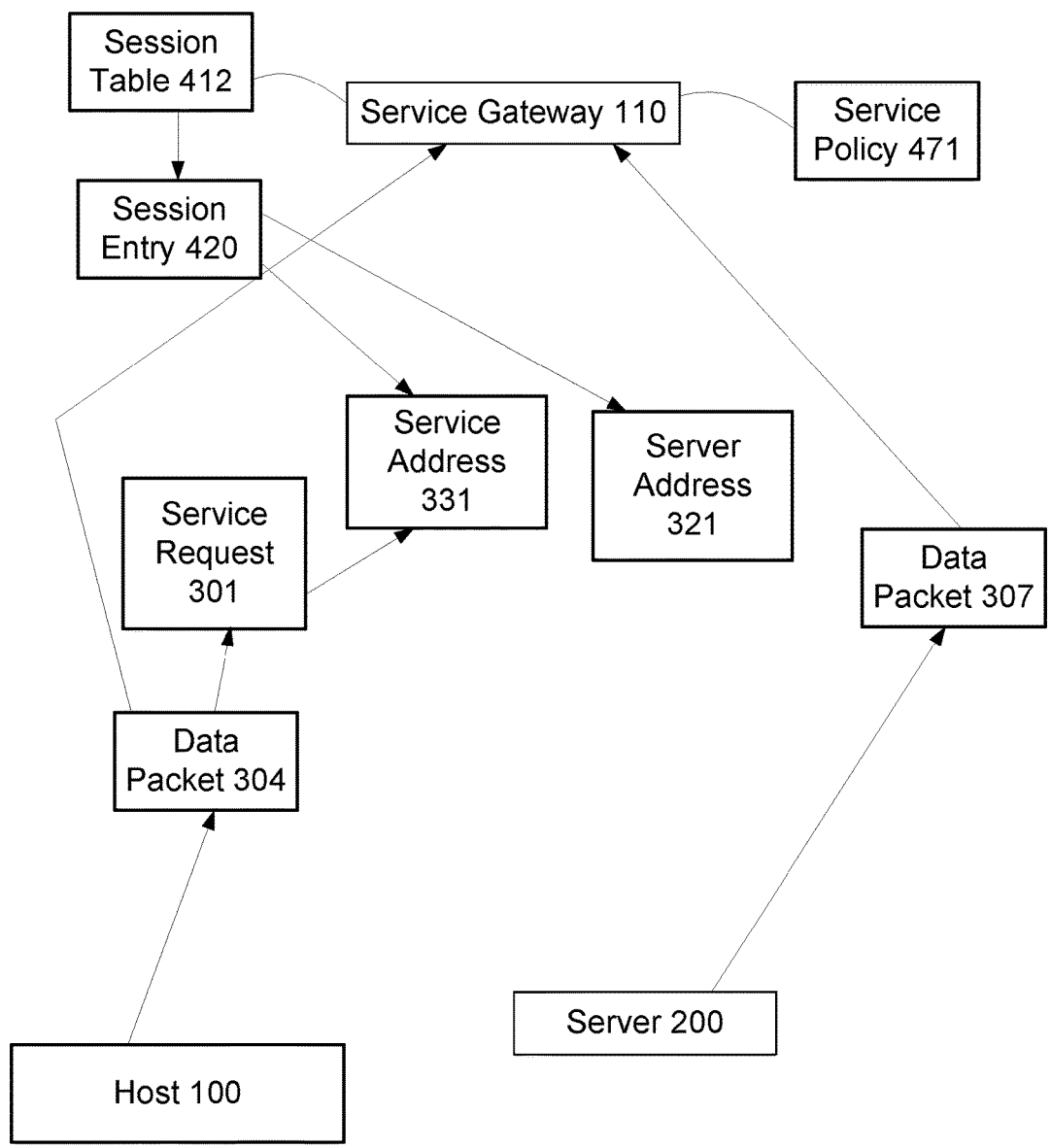
FIG. 5 illustrates an embodiment of a service gateway performing a hybrid-stateful processing method combining a stateful processing method and a stateless processing method according to the present invention.
Figure 9:
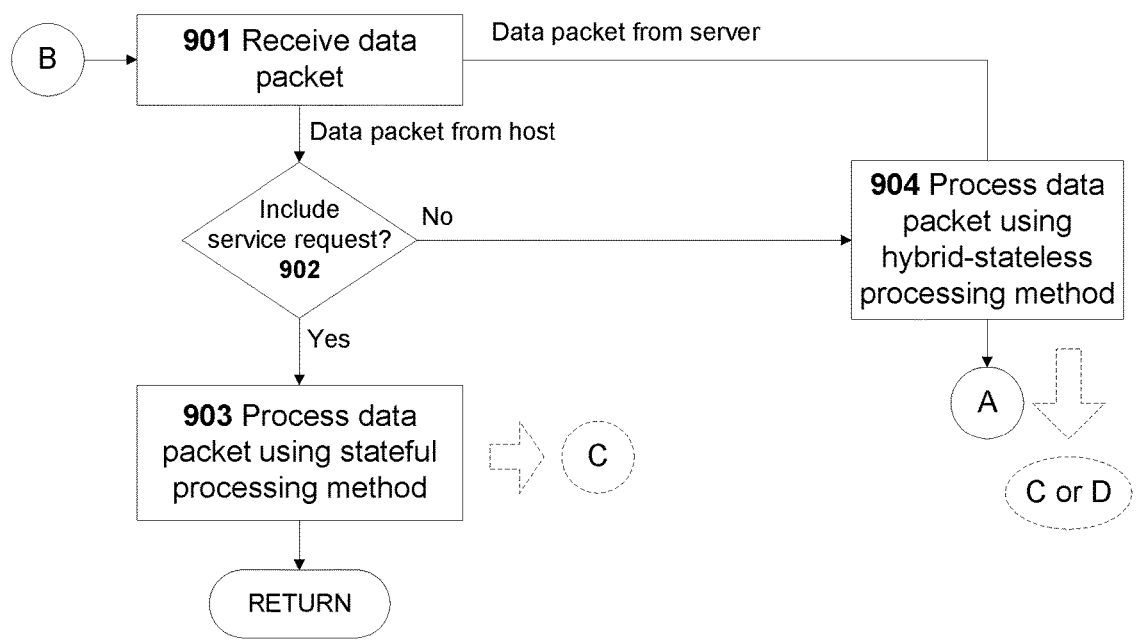
FIG. 9 is a flowchart illustrating an embodiment of a hybrid-stateful processing method according to the present invention.

FIG. 5 illustrates an embodiment of a service gateway 110 performing a hybrid-stateful processing method combining a stateful processing method and a stateless processing method according to the present invention. FIG. 9 is a flowchart illustrating an embodiment of the hybrid-stateful processing method according to the present invention. Referring to both FIGS. 5 and 9, service gateway 110 receives a data packet 304 from host 100 (901). In some embodiments, service gateway 110 determines that data packet 304 includes a service request 301 from host 100 (902). In response, service gateway 110 applies a stateful processing method to service request 301 (903). Service gateway 110 performs the stateful processing method, including applying service policy 471 to service request 301, creating session entry 420 using service address 331 of service request 301 and server address 321 of service policy 471, as described above with reference to FIG. 2.

In various embodiments, service gateway 110 determines data packet 304 does not include a service request (902). In response, service gateway 110 processes data packet 304 using the hybrid-stateless processing method, as described above with reference to FIG. 4.

In other embodiments, service gateway 110 receives a data packet 307 from server 200 (901). In this embodiment of a hybrid-stateful processing method, service gateway 110 applies a hybrid-stateless processing method to data packet 307 (904), as described above with reference to FIG. 4.

Figure 6:
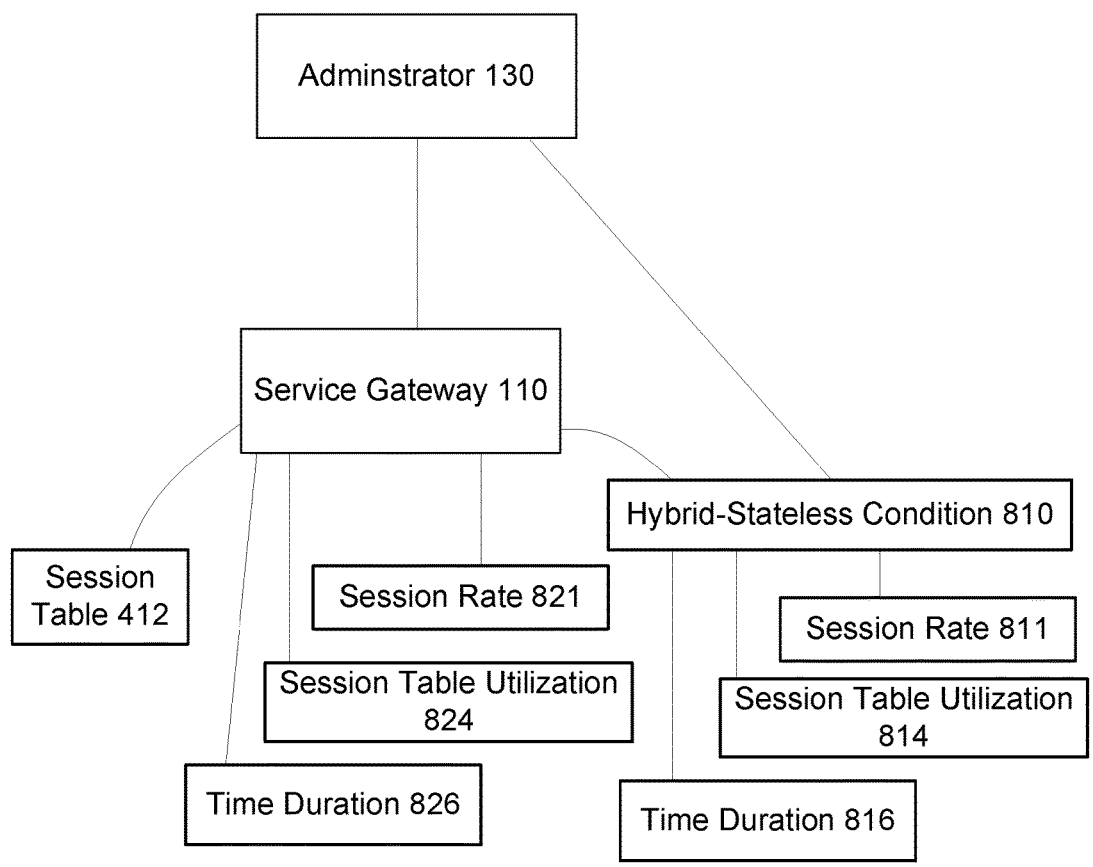
FIG. 6 illustrates an embodiment of a service gateway changing from a hybrid-stateful processing method to a hybrid-stateless processing in response to a hybrid-stateless condition being satisfied according to the present invention.
Figure 10:
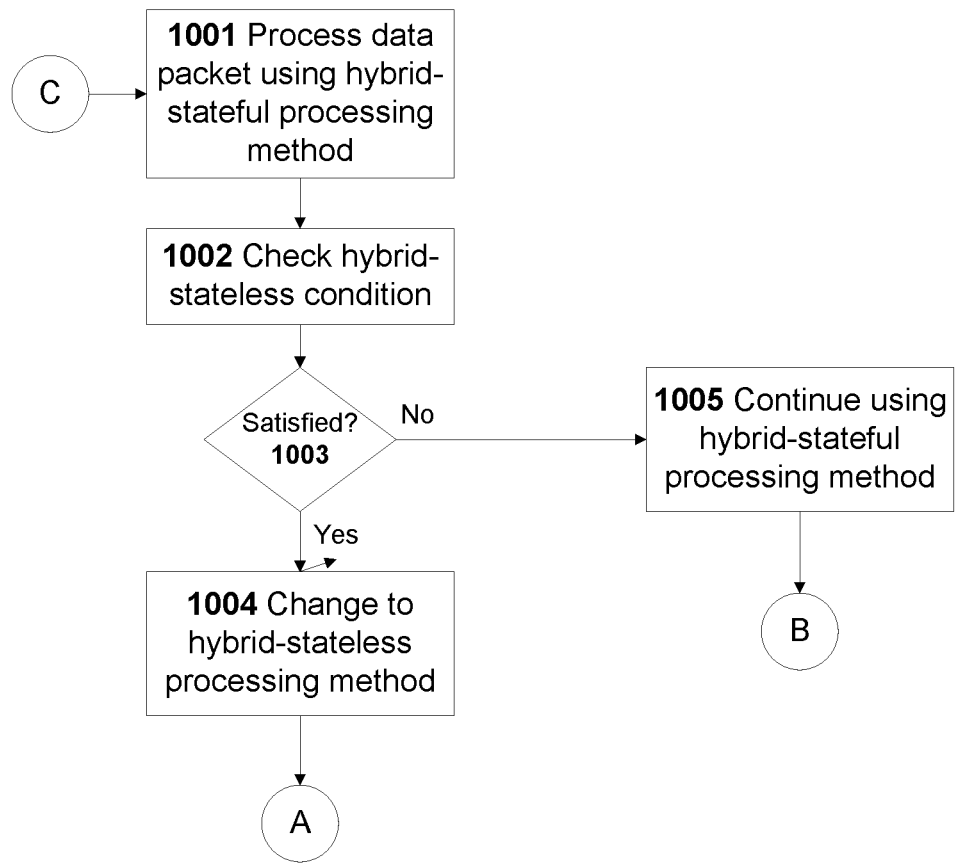
FIG. 10 is a flowchart illustrating an embodiment of a method for changing from a hybrid-stateful processing method to a hybrid-stateless processing in response to a hybrid-stateless condition being satisfied according to the present invention.

FIGS. 6 and 10 illustrate an embodiment of a service gateway and a method, respectfully, for changing from a hybrid-stateful processing method to a hybrid-stateless processing method in response to a hybrid-stateless condition being satisfied according to the present invention. Referring to both FIGS. 6 and 10, service gateway 110 is using a hybrid-stateful processing method (1001). Service gateway 110 maintains a hybrid-stateless condition 810. Service gateway 110 checks if hybrid-stateless condition 810 is satisfied (1002). In response to determining that the hybrid-stateless condition 810 is satisfied (1003), service gateway 110 changes to a hybrid-stateless processing method (1004). The service gateway 110 processes the next data packet received using the hybrid-stateless processing method, as described above with reference to FIGS. 4 and 8. In response to determining that the hybrid-stateless condition 810 is not satisfied (1003), the service gateway 110 continues using the hybrid-stateful processing method (1005), as described above with reference to FIGS. 5 and 9.

In some embodiments, hybrid-stateless condition 810 includes a session rate 811. For example, session rate 811 is 10 thousand sessions per second, 5 thousand active sessions per second, or one hundred sessions per 10 milliseconds.

In various embodiments, service gateway 110 calculates a session rate 821. Session rate 821 can be calculated based on a count of active host-side service sessions over a period of time. When the service session is associated with a session entry in session table 412, a service session is active. In various embodiments, session rate 821 calculates a difference between a count of received service requests and a count of received service termination requests over a period of time. In other embodiments, session rate 821 calculates a count of service requests received over a period of time.

In some embodiments, service gateway 110 calculates a session rate 821 in a predetermined period of time, such as every second, once every 250 milliseconds, once every 3 seconds or once every 10 seconds. In other embodiments, service gateway 110 calculates session rate 821 at variable times. For example, service gateway 110 calculates session rate 821 when a data packet from a host is received; when a service request is received; when a service termination request is received; or when a data packet is received from server 200. Service gateway 110 compares session rate 821 with session rate 811 of hybrid-stateless condition 810. If session rate 821 exceeds or is equal to session rate 811, service gateway 110 determines that hybrid-stateless condition 810 is met and satisfied.

In various embodiments, hybrid-stateless condition 810 includes a session table utilization 814. A session table utilization is a parameter setting forth a percentage of the session table capacity that is storing session entries. Hybrid-stateless condition 810 is satisfied if a count of stored session entries of session table 412 exceeds session table utilization 814. For example, session table utilization 814 is 90%, 85% or 95%. Service gateway 110 calculates a session table utilization 824 from time to time by calculating a count of stored session entries of session table 412. In some embodiments, service gateway 110 calculates session table utilization 824 periodically, such as every second, once every 20 milliseconds, once every 500 milliseconds, or once every 2 seconds. In other embodiments, service gateway 110 calculates session table utilization 824 when service gateway 110 processes a service request, a service termination request, or a data packet.

Service gateway 110 compares session table utilization 824 with session table utilization 814 of hybrid-stateless condition 810. When session table utilization 824 exceeds or is equal to session table utilization 814, service gateway 110 determines that hybrid-stateless condition 810 is met and satisfied.

In some embodiments, hybrid-stateless condition 810 further includes a time duration 816, where hybrid-stateless condition 810 must be considered met for at least a time duration 816 in order for the hybrid-stateless condition 810 to be satisfied. Examples of time duration 816 include 120 seconds, 30 seconds, and 5 seconds. Service gateway 110 checks from time to time whether the hybrid-stateless condition 810 is met, as described earlier. In various embodiments, service gateway 110 further includes a time duration 826 stored in memory. Initially, service gateway 110 assigns a value of 0 to the time duration 826. From time to time, service gateway 110 checks if hybrid-stateless condition 810 is met. If hybrid-stateless condition 810 is met, service gateway 110 increases the time duration 826 by an amount of time elapsed since the last time the hybrid-stateless condition 810 was checked. After the time duration 826 is modified, service gateway 110 checks if the time duration 826 exceeds time duration 816. If time duration 826 exceeds time duration 816, service gateway 110 determines that hybrid-stateless condition 810 is satisfied. Service gateway 110 subsequently changes to employ a hybrid-stateless method with subsequently received data packets.

If service gateway 110 determines hybrid-stateless condition 810 is not met, service gateway 110 modifies the time duration 826 to a value of 0.

In some embodiments, service gateway 110 receives hybrid-stateless condition 810 from an operator or an administrator 130. Administrator 130 can be a human operator provisioning hybrid-stateless condition 810 onto service gateway 110. Administrator 130 can be a network management system sending hybrid-stateless condition 810 to service gateway 110. Administrator 130 may include a storage medium storing hybrid-stateless condition 810. Service gateway 110 retrieves hybrid-stateless condition 810 from the storage of administrator 130.

Figure 7:
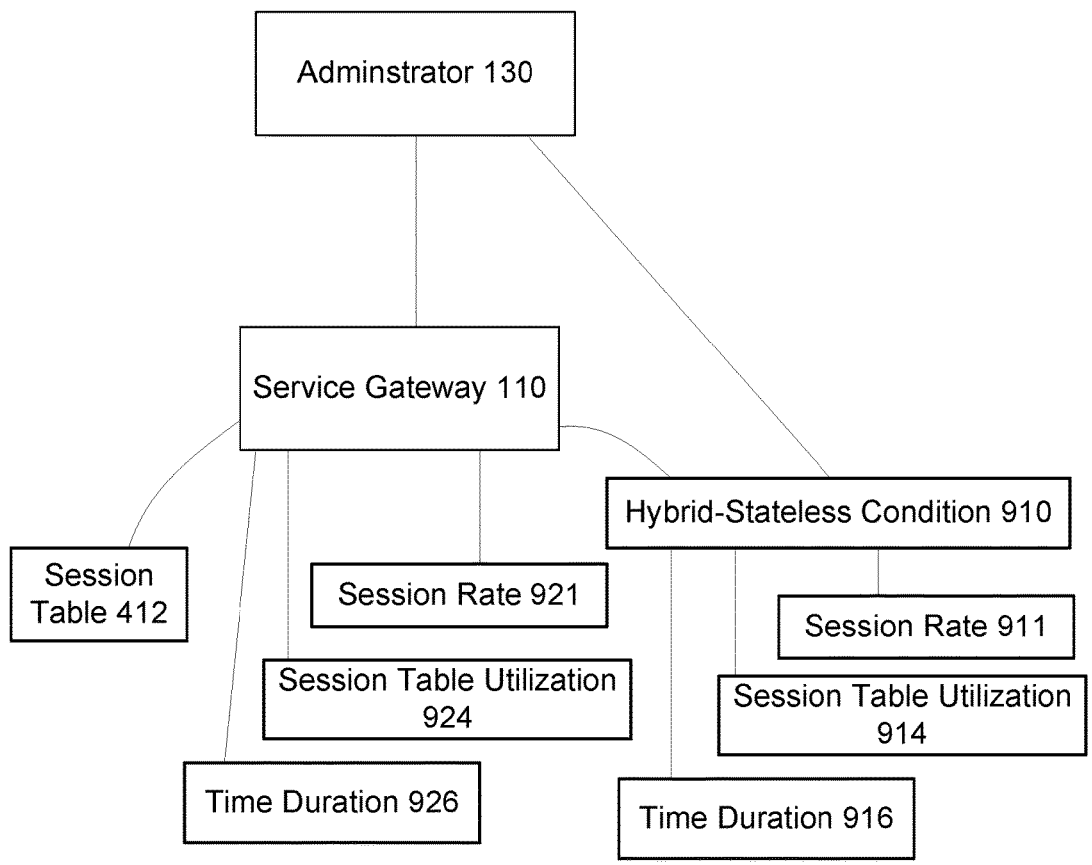
FIG. 7 illustrates an embodiment of a service gateway changing from a hybrid-stateless processing method to a hybrid-stateful processing method in response to a hybrid-stateful condition being satisfied according to the present invention.
Figure 11:
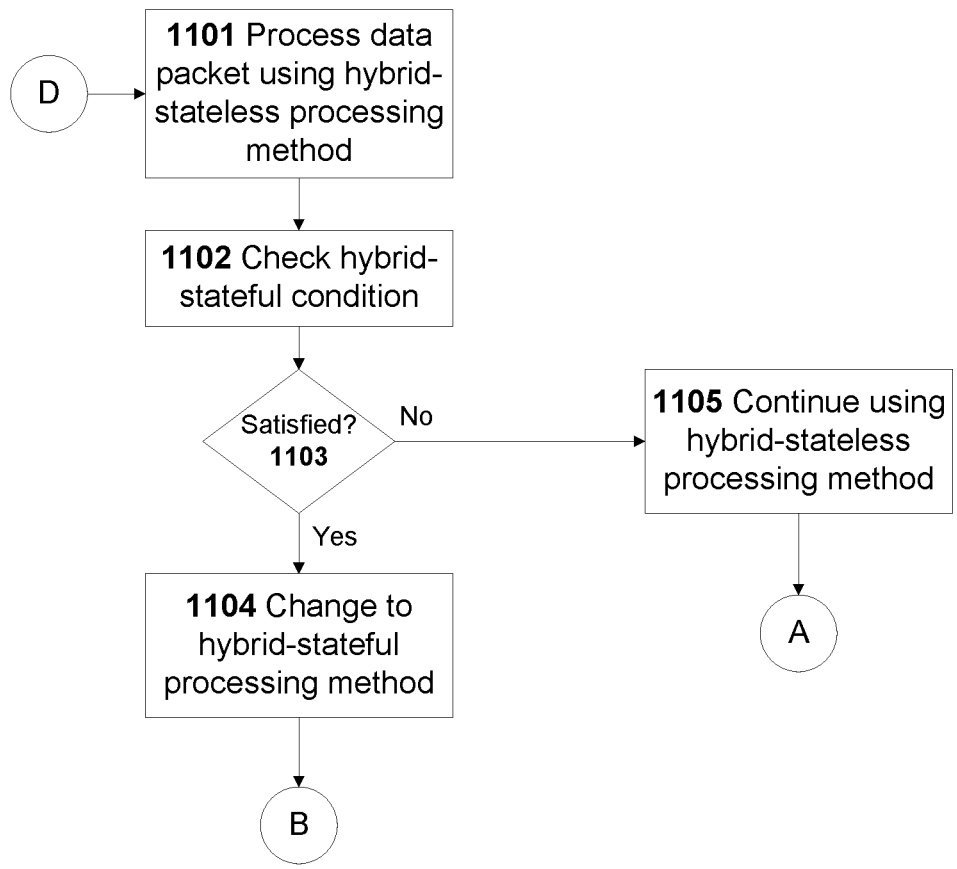
FIG. 11 is a flowchart illustrating an embodiment of a method for changing from a hybrid-stateless processing method to a hybrid-stateful processing method in response to a hybrid-stateful condition being satisfied according to the present invention.

FIGS. 7 and 11 illustrate an embodiment of a service gateway and a method, respectfully, for changing from a hybrid-stateless processing method to a hybrid-stateful processing method in response to a hybrid-stateful condition being satisfied according to the present invention. Referring to both FIGS. 7 and 11, service gateway 110 employs a hybrid-stateless processing method (1101). Service gateway 110 maintains a hybrid-stateful condition 910. Service gateway 110 checks if hybrid-stateful condition 910 is satisfied (1102). In response to determining that the hybrid-stateful condition 910 is satisfied (1103), service gateway 110 changes to a hybrid-stateful processing method (1104) and processes the next data packet using the hybrid-stateful processing method, described above with reference to FIGS. 5 and 9. In response to determining that the hybrid-stateful condition 910 is not satisfied (1103), service gateway 110 continues using the hybrid-stateless processing method (1105) and processes the next data packet using the hybrid-stateless processing method, as described above with reference to FIGS. 4 and 8.

In some embodiments, hybrid-stateful condition 910 includes a session rate 911. For example, session rate 911 is 1 thousand sessions per second, 500 active sessions per second, or ten sessions per 10 milliseconds.

Service gateway 110 can calculate a session rate 921. In some embodiments, session rate 921 calculates a difference between a count of received service requests and a count of received service termination requests over a period of time. Session rate 921 may also calculate a count of service requests received over a period of time. In various embodiments, service gateway 110 determines if a data packet received from a host includes a service request before applying a hybrid-stateless processing method to the received data packet. Service gateway 110 may also determine if a data packet received from a host or a server includes a service termination request before applying a hybrid-stateless processing method to the received data packet.

In some embodiments, service gateway 110 calculates session rate 921 in a predetermined period of time, such as every second, once every 100 milliseconds, once every 3 seconds, or once every 5 seconds. Service gateway 110 may also calculate session rate 921 at variable times. For example, service gateway 110 calculates session rate 921 when a data packet from a host is received; when a service request is received; when a service termination request is received; or when a data packet is received from a server. Service gateway 110 compares session rate 921 with session rate 911. If session rate 921 is below or smaller than session rate 911, service gateway 110 determines that hybrid-stateful condition 910 is met and satisfied.

In various embodiments, hybrid-stateful condition 910 includes a session table utilization 914. Hybrid-stateful condition 910 is satisfied if a count of stored session entries of session table 412 does not exceed session table utilization 914. For example, session table utilization 914 is 60%, 75% or 45%. Service gateway 110 calculates session table utilization 924 from time to time by calculating a count of stored session entries of session table 412. In some embodiments, service gateway 110 calculates session table utilization 924 periodically, such as every second, once every 20 milliseconds, once every 500 milliseconds, or once every 2 seconds. Service gateway 110 may also calculate session table utilization 924 when service gateway 110 processes a service request, a service termination request, or a data packet.

Service gateway 110 compares session table utilization 924 with session table utilization 914 of hybrid-stateful condition 910. If session table utilization 924 is smaller than session table utilization 914, service gateway 110 determines that hybrid-stateful condition 910 is met and satisfied.

Hybrid-stateful condition 910 may further include a time duration 916, where hybrid-stateful condition 910 must be considered met for at least a time duration 916 in order for the hybrid-stateful condition 910 is satisfied. Examples of time duration 916 include 100 seconds, 40 seconds, and 5 seconds. Service gateway 110 checks from time to time if the hybrid-stateful condition 910 is met as described earlier. In some embodiments, service gateway 110 further includes a time duration 926 stored in memory. Initially, service gateway 110 assigns a value of 0 to the time duration 926. From time to time, service gateway 110 determines if hybrid-stateful condition 910 is met. If hybrid-stateful condition 910 is met, service gateway 110 increases the time duration 926 by an amount of time elapsed since the last time the hybrid-stateful condition 910 was checked. In various embodiments, after the time duration 926 is modified, service gateway 110 checks if the time duration 926 exceeds time duration 916. If time duration 926 exceeds time duration 916, service gateway 110 determines hybrid-stateful condition 910 is satisfied. Service gateway 110 subsequently changes to employ a hybrid-stateful method with subsequently received data packets.

In some embodiments, service gateway 110 receives hybrid-stateful condition 910 from an operator or an administrator 130. Administrator 130 can be a human operator provisioning hybrid-stateful condition 910 onto service gateway 110. Administrator 130 can be a network management system sending hybrid-stateful condition 910 to service gateway 110. Administrator 130 can include a storage medium storing hybrid-stateful condition 910. Service gateway 110 retrieves hybrid-stateful condition 910 from the storage of administrator 130.

Returning to FIG. 8, FIG. 8 shows that when the service gateway 110 is processing data packets using the stateful processing method (805), the service gateway 110 would check whether the hybrid-stateless condition 801 is met (see FIG. 10). FIG. 8 also shows that when the service gateway 110 is processing data packets using the stateless processing method (808), the service gateway 110 would check whether the hybrid-stateful condition 910 is met (see FIG. 11). However, the references (C and D) to FIGS. 10 and 11 are not intended to convey any order of steps. The checking of the conditions 810 or 910 may occur concurrently with the processing of data packets, as described above with reference to FIGS. 4 and 8.

Returning to FIG. 9, FIG. 9 shows that when the service gateway 110 is processing data packets using the stateful processing method (903), the service gateway 110 would check whether the hybrid-stateless condition 810 is met (see FIG. 10). FIG. 9 also shows that when the service gateway 110 is processing data packets using the hybrid-stateless processing method (904), the service gateway 110 would either check if the hybrid-stateless condition 810 or the hybrid-stateful condition 910 is met (see FIGS. 10 and 11), depending on the processing during the hybrid states processing method per FIGS. 4 and 8. However, the reference to FIGS. 10 (C) and 11 (D) are not intended to convey any order of steps. The checking of the conditions 810 or 910 may occur concurrently with the processing of data packets as illustrated in FIGS. 5 and 9.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing data packets sent over a communication session between a host and a server by a service gateway, comprising:
    determining, by the service gateway, that a hybrid-stateless condition is satisfied; and
    based on the determination that the hybrid-stateless condition is satisfied, processing a subsequently received data packet, by the service gateway, using a hybrid-stateless processing by matching data included in the subsequently received data packet to a service mapping table to determine, based on the match, a server to which the subsequently received data packet is to be sent.

2. The method of claim 1, wherein the determining, by the service gateway, that the hybrid-stateless condition is satisfied comprises determining, by the service gateway, that a time duration stored in a memory exceeds a predetermined time duration.

3. The method of claim 1, wherein the determining, by the service gateway, that the hybrid-stateless condition is satisfied comprises receiving, from an administrator, the hybrid-stateless condition.

4. The method of claim 3, wherein the administrator comprises:
    a human operator;
    a network management system; or
    a storage medium storing the hybrid-stateless condition.

5. The method of claim 1, further comprising:
    determining, by the service gateway, that the hybrid-stateless condition is not satisfied, and
    based on the determination that the hybrid-stateless condition is not satisfied, processing, by the service gateway, the subsequently received data packet using a hybrid-stateful processing.

6. The method of claim 5, wherein the determining that the hybrid-stateless condition is not satisfied includes determining that a time duration stored in a memory does not exceed the predetermined time duration.

7. The method of claim 1, wherein the service gateway is configured to maintain a session table and the service mapping table in a storage.

8. The method of claim 1, wherein the hybrid-stateless condition comprises a predetermined session rate, the determining by the service gateway that the hybrid-stateless condition is satisfied comprising:
calculating a session rate for a plurality of communication sessions received by the service gateway;
determining that the calculated session rate is greater than or equals the predetermined session rate by the service gateway; and
in response to determining that the calculated session rate is greater than or equals the predetermined session rate, determining, by the service gateway, that the hybrid-stateless condition is satisfied.

9. The method of claim 8, wherein the calculated session rate comprises:
a difference between a count of received service requests and a count of received service termination requests over a predetermined period of time or
a count of service requests over the predetermined period of time.

10. The method of claim 1, wherein the hybrid-stateless condition comprises a predetermined session table utilization, wherein the determining, by the service gateway, that the hybrid-stateless condition is satisfied comprises:
counting a number of stored session entries in the session table by the service gateway;
determining that the number of stored session entries exceeds or is equal to the predetermined session table utilization by the service gateway; and
in response to determining that the number of stored session entries exceeds or is equal to the predetermined session table utilization, determining by the service gateway that the hybrid-stateless condition is satisfied.

11. A system, comprising:
a service gateway comprising a processor and a computer readable storage medium having computer readable program code embodied therewith, the computer readable program code configured to:
determine that a hybrid-stateful condition is satisfied; and
in response to determining that the hybrid-stateful condition is satisfied, process a subsequently received data packet using a hybrid-stateful processing method by matching data included in the subsequently received data packet to a service mapping table to determine, based on the match, a server to which the subsequently received data packet is to be sent.

12. The system of claim 11, wherein the determination that the hybrid-stateful condition is satisfied comprises:
comparing a time duration stored in a memory against a predetermined time duration by the service gateway; and
determining that the time duration stored in the memory exceeds the predetermined time duration.

13. The system of claim 11, wherein the determination that the hybrid-stateful condition is satisfied comprises receiving, from an administrator, the hybrid-stateful condition by the service gateway.

14. The system of claim 13, wherein the administrator comprises:
a human operator;
a network management system; or
a storage medium storing the hybrid-stateful condition.

15. The system of claim 11, further comprising:
determining that that the hybrid-stateful condition is not satisfied; and
based on the determination that the hybrid-stateful condition is not satisfied, process the subsequently received data packet using the hybrid-stateful processing method.

16. The system of claim 11, wherein the hybrid-stateless processing method utilizes the session table and a service mapping table at the service gateway.

17. A method for processing data packets sent over a communication session between a host and a server by a service gateway, the method comprising:
determining, by the service gateway, that a hybrid-stateful condition is satisfied; and
in response to determining that the hybrid-stateful condition is satisfied, processing a subsequently received data packet by the service gateway using a hybrid-stateful processing method by matching data included in the subsequently received data packet to a session table to determine, based on the matching, a server to which the subsequently received data packet is to be sent.

18. The method of claim 17, wherein the determining by the service gateway whether the hybrid-stateful condition is satisfied comprises:
comparing a time duration stored in memory against a predetermined time duration by the service gateway;
determining that the time duration stored in memory exceeds the predetermined time duration; and
in response to determining that the time duration stored in memory exceeds the predetermined time duration, determining by the service gateway that the hybrid-stateful condition is satisfied.

19. The method of claim 17, wherein the hybrid-stateful condition comprises a predetermined session rate, wherein the determining, by the service gateway, that the hybrid-stateful condition is satisfied comprises:
calculating a session rate for a plurality of communication sessions received by the service gateway;
determining that the calculated session rate is less than the predetermined session rate by the service gateway; and
in response to determining that the calculated session rate is less than the predetermined session rate.

20. The method of claim 19, wherein the calculated session rate comprises:
a difference between a count of received service requests and a count of received service termination requests over a predetermined period of time or
a count of service requests over the predetermined period of time.

* * * * *